(12) United States Patent
Spinelli

(10) Patent No.: US 8,408,119 B2
(45) Date of Patent: Apr. 2, 2013

(54) ESPRESSO COFFEE DISPENSING MACHINES USING SINGLE-DOSE GROUND COFFEE PODS

(75) Inventor: Giovanni Spinelli, Parabita (IT)

(73) Assignee: Spinel, S.R.L., Parabita (LE) (IT)

( * ) Notice: Subject to any disclaimer, the term of this patent is extended or adjusted under 35 U.S.C. 154(b) by 533 days.

(21) Appl. No.: 12/452,551

(22) PCT Filed: Oct. 16, 2007

(86) PCT No.: PCT/IT2007/000719
§ 371 (c)(1),
(2), (4) Date: Jan. 8, 2010

(87) PCT Pub. No.: WO2007/010997
PCT Pub. Date: Jan. 22, 2009

(65) Prior Publication Data
US 2010/0132565 A1    Jun. 3, 2010

(30) Foreign Application Priority Data
Jul. 13, 2007    (IT) .............................. BA2007A0054

(51) Int. Cl.
*A47J 31/44*        (2006.01)

(52) U.S. Cl. .......................... 99/295; 99/302 P; 99/302 R
(58) Field of Classification Search ................. 99/302 P, 99/302 R, 289 R, 295
See application file for complete search history.

(56) References Cited

U.S. PATENT DOCUMENTS

| 5,134,924 | A | * | 8/1992 | Vicker | 99/280 |
| 5,454,293 | A | * | 10/1995 | Santi | 99/289 R |
| 5,531,152 | A | * | 7/1996 | Gardosi | 99/289 R |
| 5,638,741 | A | * | 6/1997 | Cisaria | 99/295 |
| 5,855,161 | A | * | 1/1999 | Cortese | 99/289 P |
| 5,992,298 | A | * | 11/1999 | Illy et al. | 99/281 |

* cited by examiner

*Primary Examiner* — Reginald L Alexander
(74) *Attorney, Agent, or Firm* — R. Ruschena Patent Agent, LLC

(57) ABSTRACT

Single-dose pod coffee machine comprising a casing, an external maneuvering lever (1), a coffee dispensing spout, a pod-holder body comprising, in turn, an upper portion (11) and a lower portion (13), a heat-exchanger (10), controlling and adjusting means, actuating means, supporting means, fixing means, sealing means and characterized in that the movement of the lever (1) drives into rotation an accelerator (19) which prevents lime build-up in the water circuit and heating of water inside the heat exchanger.

16 Claims, 6 Drawing Sheets a)            b)

ESPRESSO COFFEE DISPENSING MACHINES USING SINGLE-DOSE GROUND COFFEE PODS

RELATED APPLICATIONS

This application is the U.S National Stage under 35 USC 371 of PCT application PCT/IT/2007/000719 and claiming foreign priority based on Italian patent application BA2007A000054 filed on Jul. 13, 2007.

BACKGROUND OF THE INVENTION

1. Field of the Invention

The object of the present invention is an improvement of an espresso coffee dispensing machine using single-dose ground coffee pods.

2. Brief Description of the Prior Art

Coffee machines of this type employ a special single-dose pod-shaped filter, containing suitably ground, pre-dosed and pressed roasted coffee.

Pod coffee machines currently on the market, usually require frequent maintenance due to different problems. First, the heating cycle and water flowing at a temperature of about 90° C. result in clogging caused by lime due to the stationary components in use. Moreover, the location of the mechanical components for controlling and closing the two pod-holders results in wear of the mechanical parts by scaling (related to water leakage), which hinders the movement thereof.

SUMMARY OF THE INVENTION

The aim of the present invention is to improve pod filter coffee machines by eliminating the drawbacks as set forth above. With this aim in mind, a heat-exchanger was first conceived, equipped with a self-cleaning system and an innovative hydrodynamic profile. Furthermore, the inclusion of a three-way electric valve allows water to flow during coffee dispensing followed by emptying the water circuit and lubricating the accelerator. The lubrication effect is obtained by means of coffee residues in the discharge water. The control system for mechanical clamping of the two pod-holders was also improved, by introducing a compression movement. Finally, a system was devised for controlling the clamping force, by providing two registers placed on the respective pod-holders, with the aim of ensuring a perfect seal during coffee dispensing.

BRIEF DESCRIPTION OF THE DRAWINGS

These objects and the ensuing advantages, as well as the characteristics of the finding according to the present invention, will appear clearer from the following detailed description of a preferred embodiment thereof, provided as a non limiting example, with reference to the drawings wherein.

DETAILED DESCRIPTION OF THE PREFERRED EMBODIMENTS

Figure 1:
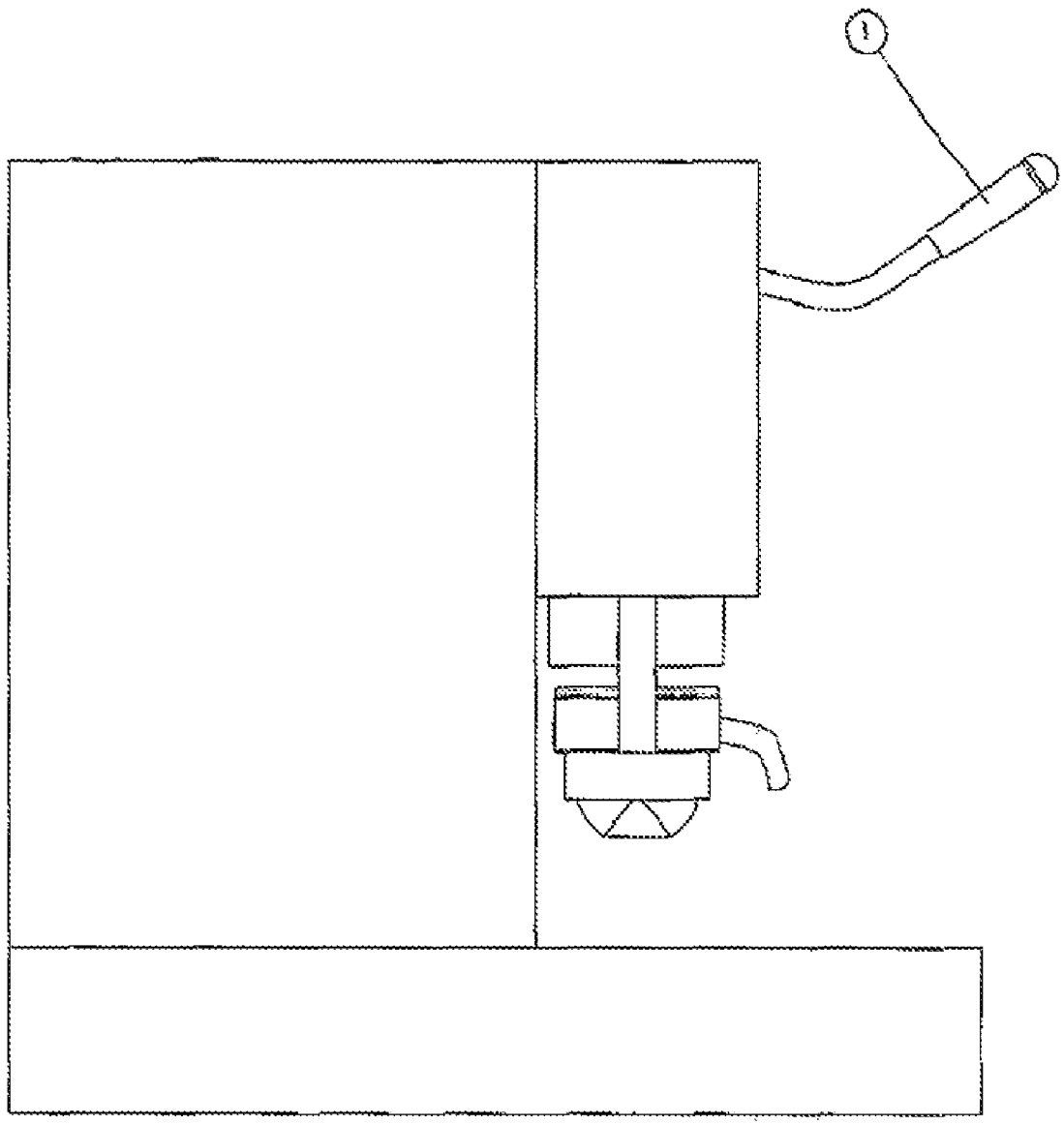
FIG. 1 shows a coffee machine, left outer side.
Figure 2:
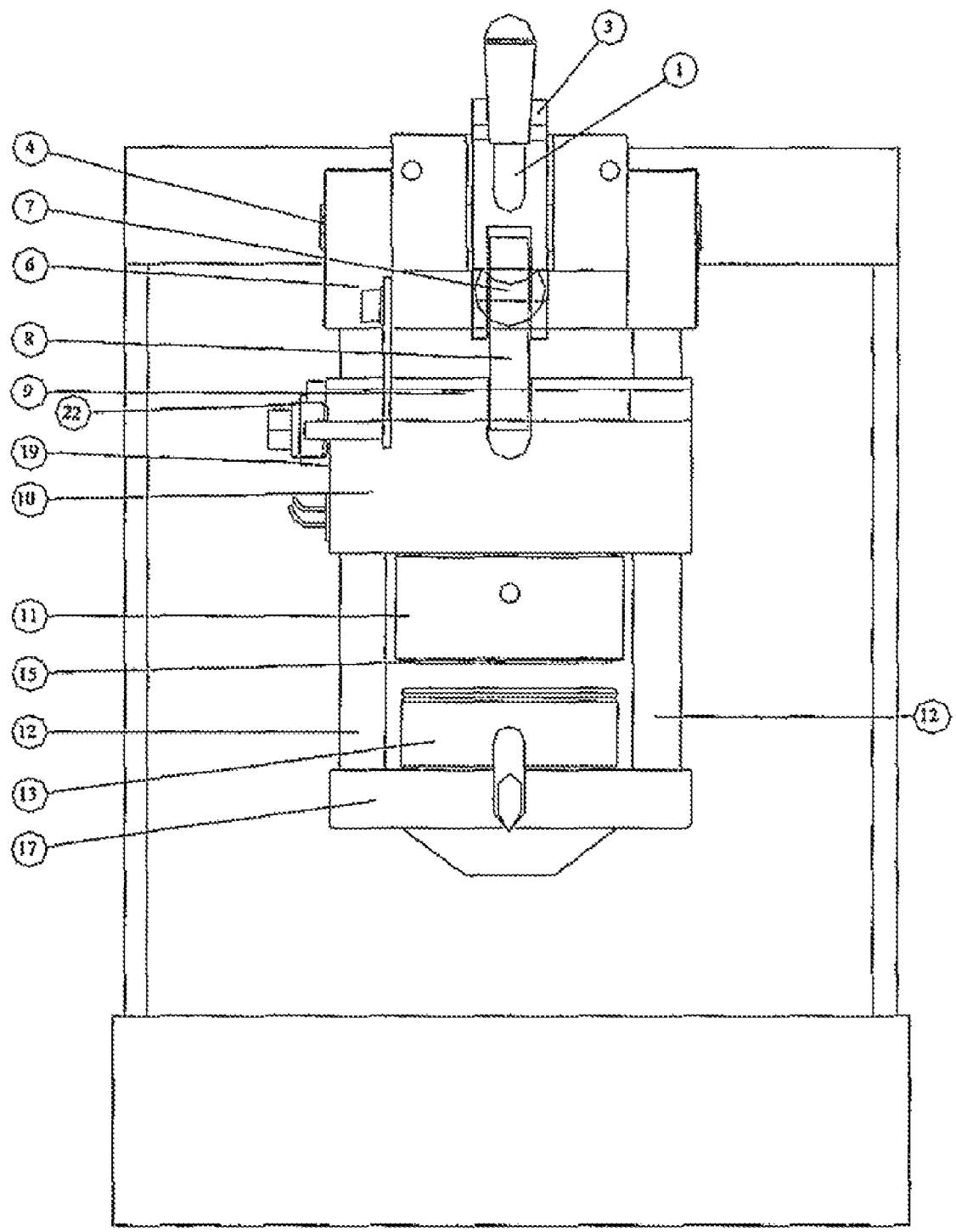
FIG. 2 shows a front view of the machine.
Figure 3:
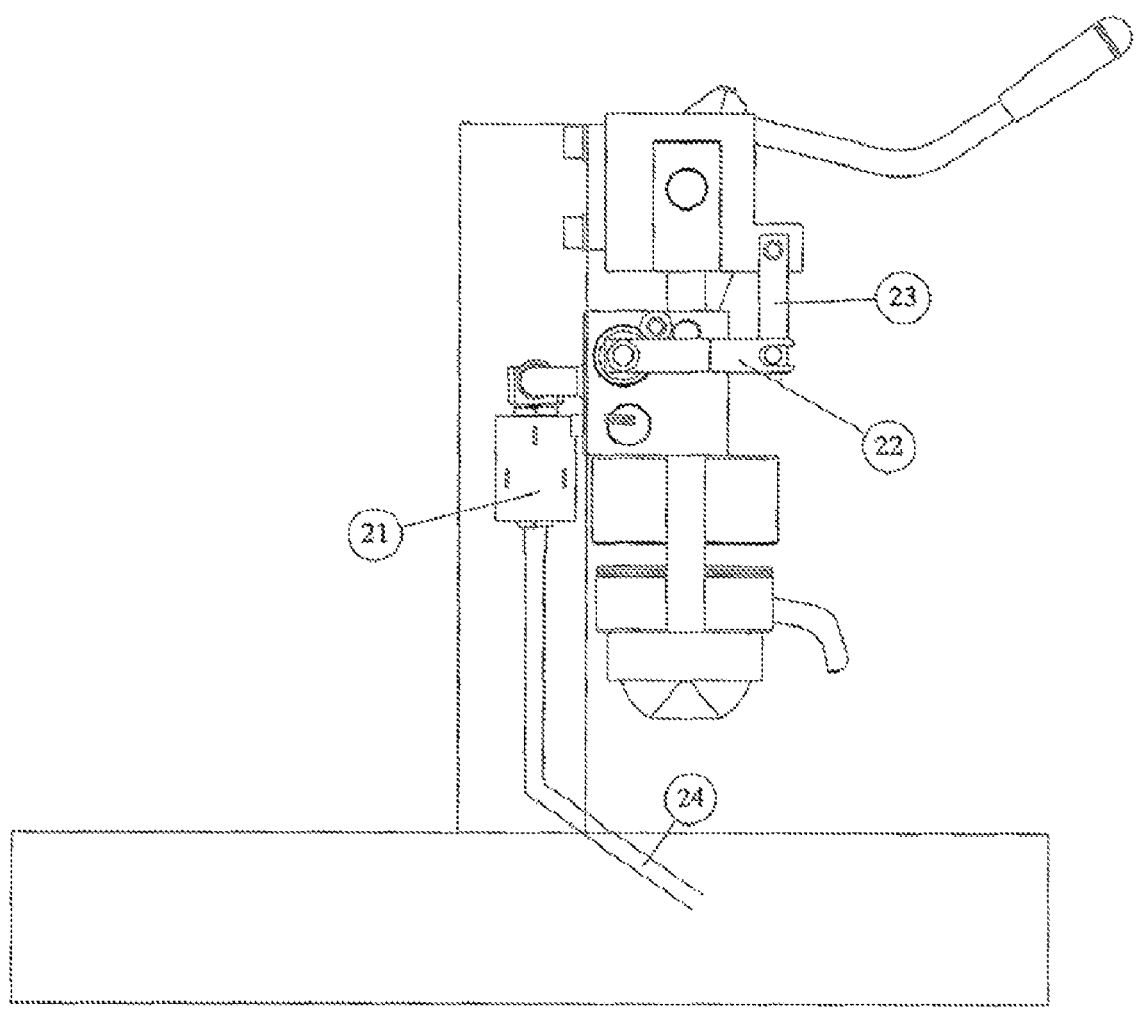
FIG. 3 shows the coffee machine, left inner side.
Figure 4:
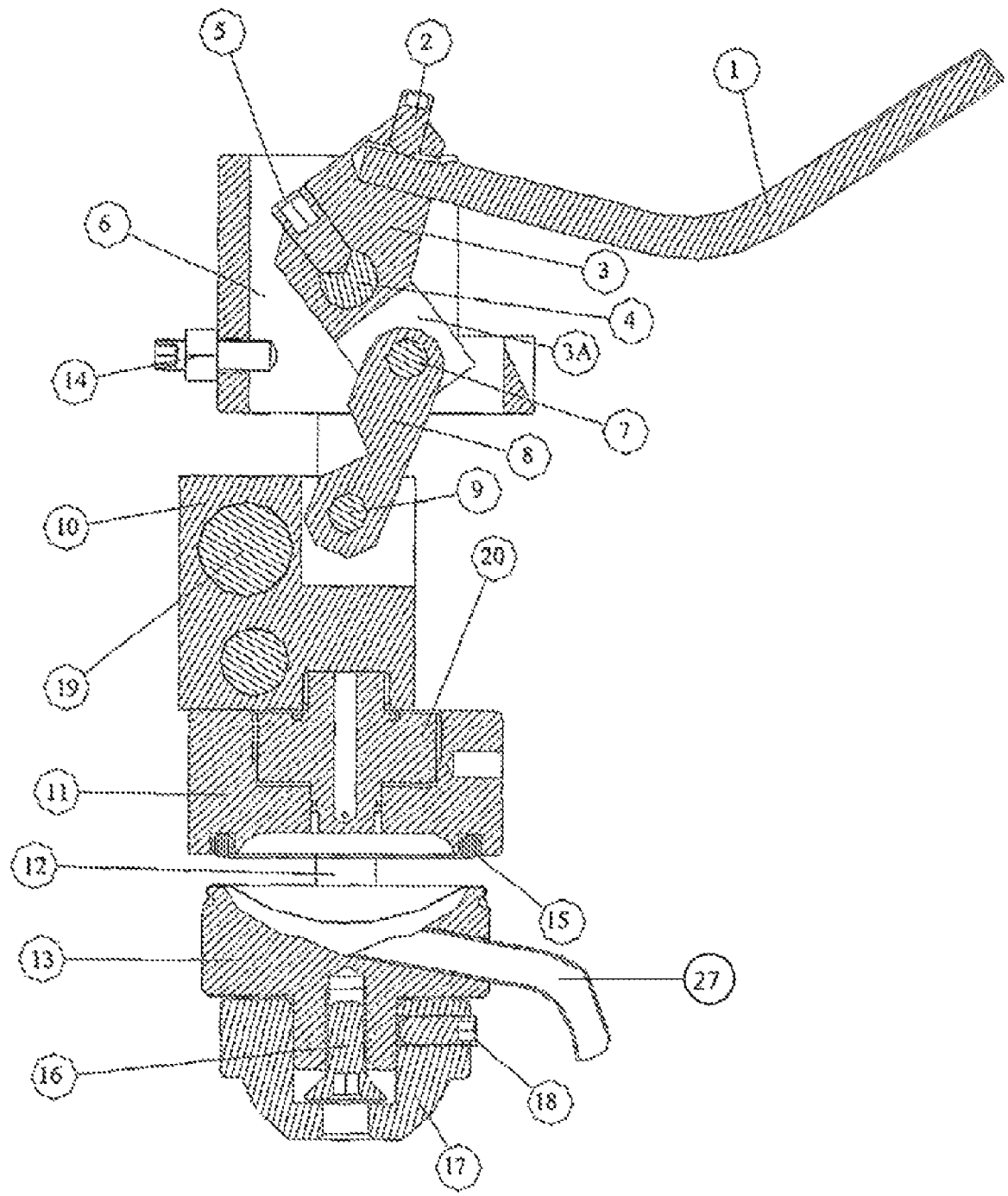
FIG. 4 shows a longitudinal section in the center line.
Figure 5:
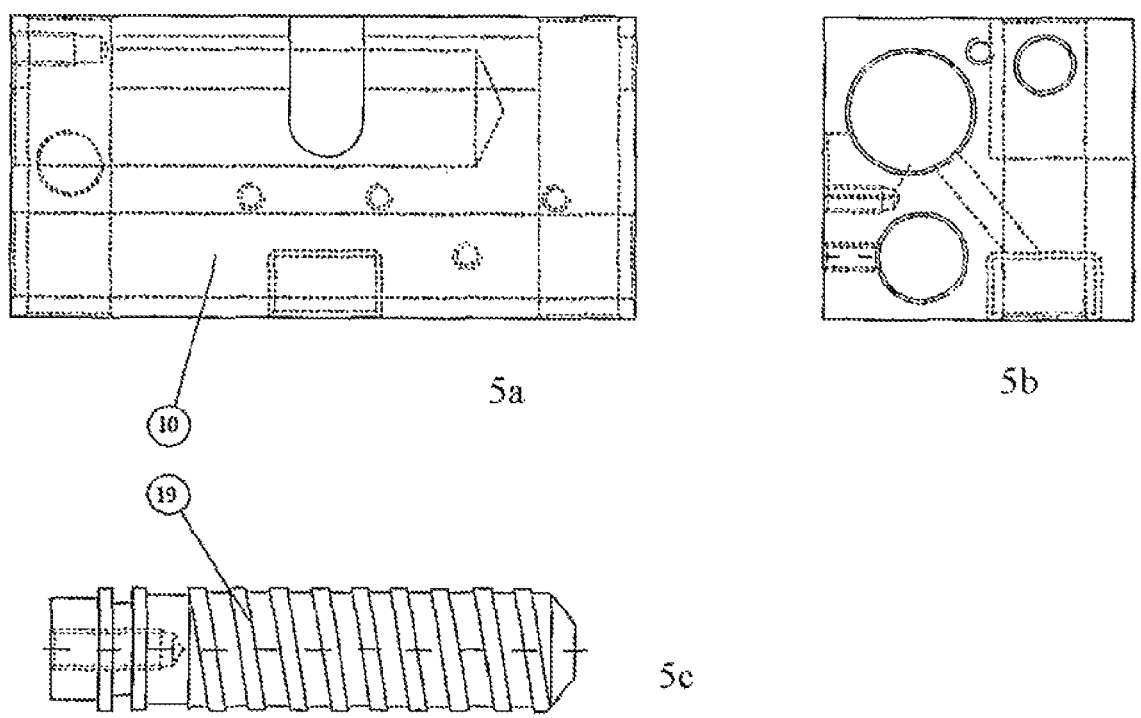
FIG. 5 shows the heat-exchanger and the accelerator.

With reference to the above Figures, the coffee machine with pod filter, object of the present invention, comprises a casing with an outer manoeuvring lever (1) and a coffee dispensing spout (27) protruding from said casing contour. For coffee extraction, the single-dose coffee pod is introduced and clamped between an upper pod-holder (11) and a lower pod holder (13). The size and profile of these pod-holders are suitable for receiving a 7 g pod according to the general manufacturing standards on the market (ESE) and for dispensing a single coffee. The outer lever (1) is fixed, by means of a threaded dowel (2) to a crank (3) which is integral with a horizontal shaft (4) through a threaded dowel (5) positioned on the upper bracket (6). At one end of the crank (3) a fork (3A) is obtained allowing the connection, by movable coupling via a cylindrical pin (7), to a rod (8), which at the opposite end, via a second cylindrical pin (9), connects by movable coupling to a heat-exchanger (10). The downward movement of the lever (1) actuates the "rod-crank" leverage. The rotation of shaft (4) moves the crank (3) and rod (8), which pushes in a vertical direction and downwards the heat-exchanger (10), to which an upper pod-holder (11) is attached by means of a threaded coupling. The flatness and concentricity of the clamping between the upper and lower pod-holders (11), (13) in the closing step is ensured by the quality movable coupling between heat-exchanger and guide studs (12).

Moreover, the movement of the lever (1) drives into rotation an accelerator (19) by means of an accelerator control lever (22) concentrically fixed on one side to the accelerator (fulcrum) and coupled on the other side, through an articulated system, to a fixed lever (23) integral with an upper lever (6). The rotation of the accelerator, taking place every time the lever (1) is actuated in order to open and close the assembly, prevents lime build-up in the water circuit and water heating. The provision of a three-way electric valve (21) allows immediate discharge of water under pressure present inside the heat-exchanger. In this step, residual water on the pod entrains coffee fat portions, which has a lubricating effect on the accelerator (19), thereby enhancing its rotation inside the heat-exchanger (10). Emptying water from the water heating circuit considerably decreases the formation of lime deposits likely to clog the water passages inside the heat-exchanger.

The clamping of the pod between the two upper and lower pod-holders (11),(13) as well as the water-tight seal during coffee dispensing is ensured by several concurrent elements.

First of these elements is the adjustment of the angle of rotation of shaft (4), which is made possible by the adjusting screw (14) also acting as a stop. This ensures a firm mechanical clamping and prevents the upper pod-holder (11) from being pushed up by the pressure resulting from the pumping of water and the operating temperature. The second element consists of an O-ring (15), arranged in a suitable seat obtained on the upper pod-holder, which by means of its elasticity helps providing a seal. The third element is represented by the possibility of adjusting both pod-holders separately and concurrently. The lower pod-holder (13) can be adjusted by a screw (16) which decreases or increases the distance from the upper pod-holder (11) by rotational movement thereof (clockwise or counterclockwise); after the adjustment, locking is provided by a threaded dowel (18) arranged on a pod-holder plate (17). The adjustment of the upper pod-holder is made through rotational movement (clockwise or counterclockwise), by threaded coupling to the cycler (20) arranged on the heat-exchanger; such adjustment increases or decreases the distance from the lower pod-holder allowing for a finer regulation.

The coffee machine of the present invention features some interesting alternative embodiments dictated by specific market needs, concerning essentially the coffee assembly.

Figure 6:
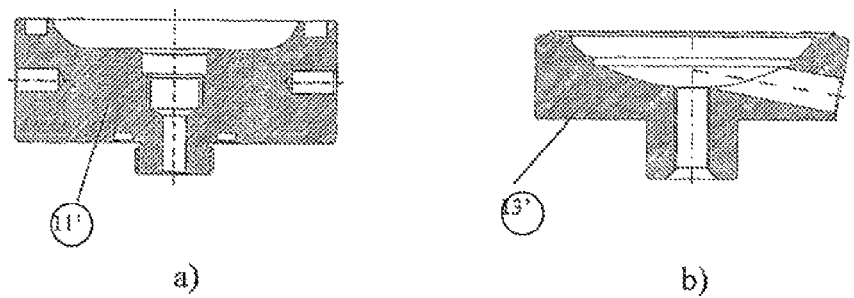
FIG. 6 shows the two pod-holders in the larger version with a 14 g pod.
Figures 7, 8, 9:
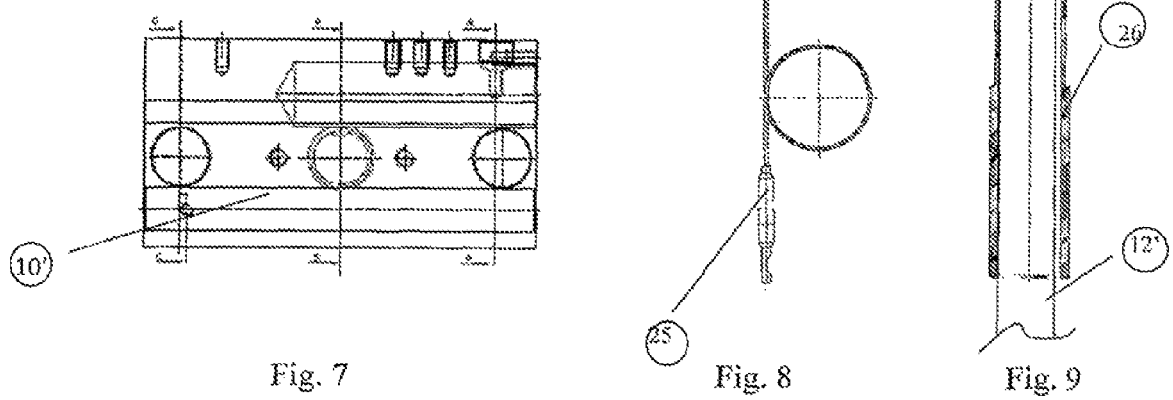
FIG. 7 depicts the heat exchanger in the larger version, according to an alternative embodiment of the machine.
FIG. 8 is a bulb thermostat for use in combination with the heat exchanger of the previous figure.
FIG. 9 shows the guide studs—brass bushings assembly, for the embodiment of the machine according to FIGS. 7 and 8.

A second embodiment of the machine allows the simultaneous dispensing of two coffee cups. This can be done only with the use of a 14 g coffee pod (twice the size of the normal coffee pod). The use of the pod entails redesigning the upper (11') and lower (13') 14 g pod-holders (FIGS. 6a, 6b), having a different width size compared to 7 g pod-holders such that they cannot be mounted on the normal coffee assembly. More specifically, the interaxial distance between the guide studs (12') of the heat-exchanger (10') changes and the horizontal control shaft (4), the fork (3A) and the pod-holder plate (17) need to be redesigned. Moreover, the studs (12'), the assembly closing lever (1) and the rod (8) are increased in size to cope with the force increase generated by the increased size of the 14 g pod-holder. Obviously, the need to increase the interaxial distance between the guide studs entails the use of a new heat-exchanger (10'). This is the most complex modification, in that the quality of espresso coffee depends on the ability of the heat-exchanger to maintain the coffee dispensing temperature as even as possible. The use of 14 g pod-holders leads then to an increase in the size of the heat-exchanger (FIG. 7) so as to have a larger contact surface with the upper pod-holder and to give the upper pod-holder a larger heat contribution. At the same time, in order to achieve almost certainly the same performance as the previous heat-exchanger, the volume of brass of the heat-exchanger, and thus the heating mass, should not vary to a great extent. The new dimensions of the heat-exchanger (longer, shorter and wider than the previous variant) are suitable for the use (see FIG. 8) of a bulb thermostat (25) arranged along the length of the heat-exchanger so to have a temperature reference no longer from a single point such as that with a contact thermostat, but distributed over the entire surface of the heat-exchanger. The fastening of the bulb thermostat on the heat-exchanger is made through an angular aluminium bracket designed so as to facilitate and speed up the possible replacement of the thermostat itself. Finally, in order to provide some heat also to the lower part of the assembly, brass bushings (26) were introduced (FIG. 9) on the guide studs of the exchanger (12').

Figure 10:
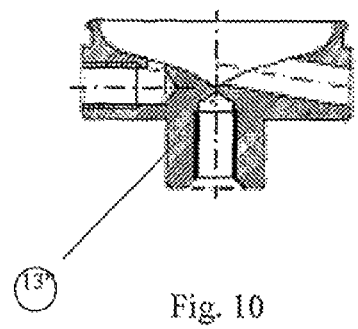
FIG. 10 shows the lower pod-holder according to a third embodiment of the machine.

A third embodiment of the machine permits dispensing a coffee filter from a 7 g coffee pod and from a 14 g coffee pod. It requires (FIG. 10) a new type of lower pod-holder (13") for both types, 7 g and 14 g, of pods. Said pod-holder features, in its rear part, means for connecting to a heat-exchanger. In particular, it features a hole with gas ⅛" thread in which a quick coupling is inserted to permit the connection of the lower pod-holder to a heat-exchanger independent from that of the coffee assembly. The dispensing of the filtered coffee, in fact, takes place in two separate steps: regular espresso coffee is dispensed in the first step, and hot water is dispensed in the next step to water down espresso coffee. The two coffee dispensing steps are controlled in terms of timing and quantities by an electronic control unit which activates the water pumps.

Finally, a third embodiment of the machine is represented by the use of the pod-holder body with an integrated acrylonitrile-butadiene-styrene (ABS) pod-holder. In this manner it is possible to reduce the quantity of metallic materials thereby obtaining a reduction in costs while maintaining the quality of the product offered.

In practice, the manufacturing details, the materials and the shape of the coffee machine with pod filter or the like can be varied without departing from the scope of the finding and thus from the scope of the patent rights.

The invention claimed is:

1. A self-cleaning espresso coffee machine using a single-dosed ground coffee pod filter comprising:
   an outer maneuvering lever (1) to lower a heat exchanger (10) using a rod (8) and a crank (3), said heat exchanger (10) has attached an upper pod-holder (11) by way of a cycler (20); said lowering of the eat exchanger (10) is achieving the clamping of the ground coffee pod between the upper pod-holder (11) and a lower pod-holder (13) which in turn is supported by a pod-holder plate (17);
   an accelerator (19) imbedded inside the heat exchanger (10) and rotated by the lowering of the outer maneuvering lever (1) by way of a fixed lever (23) and by way of an accelerator control lever (22); said accelerator's (19) rotation is preventing the lime build up and calcareous deposits inside the water circuit which includes a water heating reservoir;
   a three-way electric valve (21), operated by the lowering of the outer maneuvering lever (1), said three-way electric valve, when in an open position, allows the inlet of cold water into the water heating circuit necessary for coffee dispensing, while, in the closed position, it is emptying the water from inside the heat exchanger (10) by way of a teflon tube (24), which also draws and discharges residual water from the pod chamber, to further reduce lime build up and calcareous deposits inside the water circuit;
   controlling and adjusting means;
   a coffee dispensing spout (27);
   an external casing.

2. An espresso coffee machine according to claim 1, wherein said clamping of the ground coffee pod between the upper pod-holder (11) and the lower pod-holder (13) is creating a water-tight seal during coffee dispensing.

3. An espresso coffee machine according to claim 1, wherein said clamping of the ground coffee pod between the upper pot-holder (11) and the lower pod-holder (13) is adjusted by limiting the rotation angle of a horizontal shaft (4), using an adjustment screw (14), that, when rotated, penetrates inside the upper bracket lever (6) to limit the rotation angle of the crank (3) and related horizontal shaft (4), which is connected to the crank (3) by way of the threaded dowel (5).

4. An espresso coffee machine according to claim 3, wherein said clamping of the ground coffee pod between the upper pod-holder (11) and lower pod-holder (13) is made seal-tight by the compression of an O-ring (15), inserted inside a groove on the lower surface of the upper pod-holder (11).

5. An espresso coffee machine according to claim 2, wherein said clamping of the ground coffee pod between the upper pod-holder (11) and the lower pod-holder (13) is made effective by the capability of adjusting vertically both pod-holders positions either separately or concurrently.

6. An espresso coffee machine according to claim 5, wherein said lower pod-holder (13) is adjustable through a screw (16) which by rotationally moving clockwise or counterclockwise, decreasing or increasing the distance from the upper pod-holder (11) and the lower pod-holder (13), and wherein said adjustment is locked by a threaded dowel (18), mounted inside a pod-holder plate (17).

7. An espresso coffee machine according to claim 5, wherein said adjustment of the upper pod-holder (11) is made through a rotational movement clockwise or counterclockwise of the upper pod-holder (11), wherein said rotation movement is enabled by the threaded coupling of the upper pod-holder (11) to the cycler (20), which is in turn attached to the heat exchanger (10).

8. An espresso coffee machine according to claim 1 wherein said controlling and adjusting means is a contact thermostat.

9. An espresso coffee machine according to claim 1, wherein said single-dosed ground coffee pod filter is a 7 g ground coffee pod.

10. An espresso coffee machine according to claim 1 wherein said single-dosed ground coffee pod filter is a 14 g coffee pod enabling the simultaneous dispensing of two coffee cups and wherein the upper and lower pot holders are respectively the upper 14 g pod-holder (11') and lower pod-holder (13').

11. An espresso coffee machine according to claim 10, wherein the use of upper and lower 14 g pod-holders (11', 13') require an increased inter-axial distance of guide studs (12') of the heat exchanger (10') and an increased size of said guide studs (12'), an increased size of the outer maneuvering lever (1) assembly components, including the rod (8).

12. An espresso coffee machine according to claim 11, wherein the heat exchanger (10'), made of brass, has a larger contact surface with the upper pod-holder (11') with no substantial variation of its volume.

13. An espresso coffee machine according to claim 1, wherein the controlling and adjusting means is a bulb thermostat (25) mounted along the length of the heat exchanger (10').

14. An espresso coffee machine according to claim 11, wherein guide studs (12') are mounted inside brass bushings (26).

15. An espresso coffee machine according to claim 11, wherein the 14 g pod-holder (13') features in its rear a hole with a gas ⅛" thread in which a quick-coupling is inserted to allow the connection directly to the heat-exchanger (10') independent from that of the espresso coffee machine assembly.

16. An espresso coffee machine according to claim 1, wherein either the lower or the upper pod-holder, or both, have an integrated pod-holder insert made of acrylonitrile-butadiene-styrene (ABS) to reduce the quantity of metallic material.

\* \* \* \* \*